July 5, 1938.  W. C. TICHENOR  2,122,804
MOTION PICTURE VIEWER
Filed Nov. 23, 1936
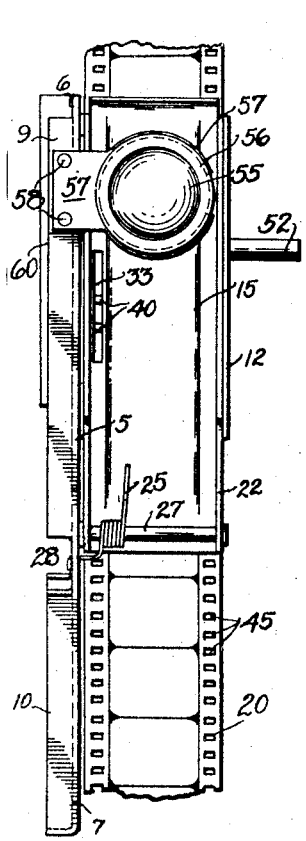
FIG. 2.
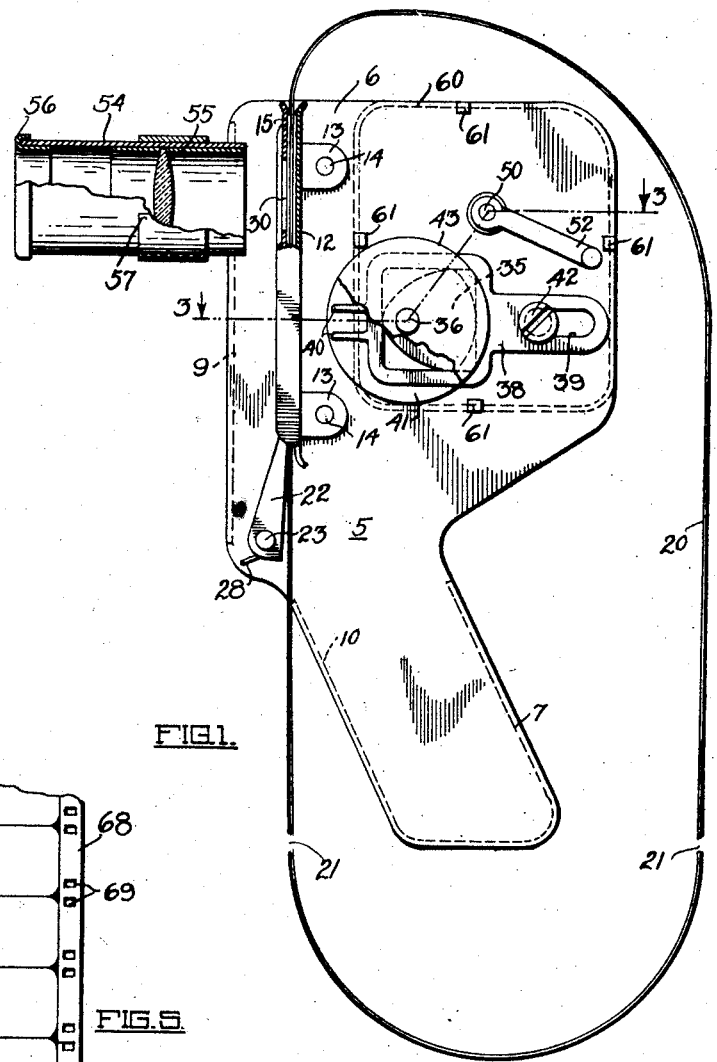
FIG. 1.
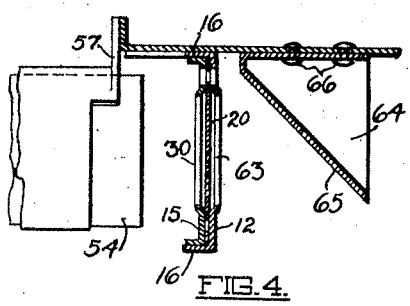
FIG. 4.
FIG. 5.
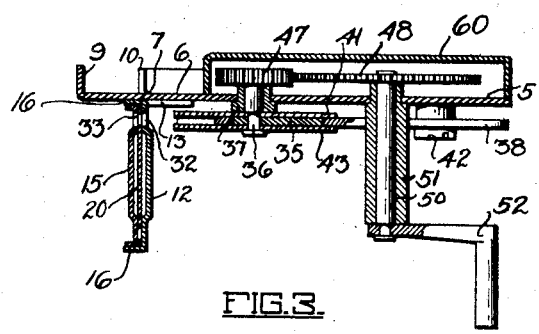
FIG. 3.
INVENTOR
WARREN C. TICHENOR
BY
ATTORNEY Patented July 5, 1938

2,122,804

UNITED STATES PATENT OFFICE 2,122,804

MOTION PICTURE VIEWER

Warren C. Tichenor, Glendale, Calif.

Application November 23, 1936, Serial No. 112,342

4 Claims. (Cl. 88—17)

This invention relates to apparatus for presenting pictures of kinematic phases of an object to view and particularly to a device of this type which may be manually operated while held and observed by the operator, the pictures being either positive prints, viewable by light reflected therefrom, or diapositives viewable by transmitted light.

An object of the invention is to permit an operator to present for his direct observation a series of pictures at a speed to provide the illusion of motion.

Another object of the invention is to efficiently and economically present a series of pictures, preferably opaque, representing different action views of an object for direct observation at a speed to provide the illusion of motion.

A further object of the invention is to provide a toy device for directly viewing a series of opaque pictures respecting kinematic phases of an object.

A still further object of the invention is to provide a device for viewing pictures of kinematic phases of an object, said pictures being formed in a continuous strip adapted to adhere to a continuous loop carrier.

Motion picture apparatus of various types is well known, the present invention, however, being directed to a hand operated toy adapted to intermittently advance a picture web or film therethrough at a speed to provide the illusion of motion. The device is of the simplest nature having a minimum number of parts to provide the necessary operation. It is adapted to be held in one hand and actuated by the other hand while viewing opaque pictures by light reflected therefrom. With a slight modification, the device may also be used for diapositives viewable with transmitted light.

Hand operated devices of the same general nature are known, these prior devices being suitable only for narrow diapositive film. The present device, however, will accommodate an opaque web or diapositive film of such a width as to enable pictures of comparatively large size to be intermittently presented to the eye at a speed to provide the illusion of motion. The web may be one of several novel types disclosed and claimed in my co-pending application S. N. 136,381 filed April 12, 1937. The device is so simple and efficient in operation that it may be operated by a child. Furthermore, the design and arrangement of the essential elements are such that the toy may be manufactured at a very low cost.

Although the novel features which are believed to be characteristic of this invention will be pointed out with particularity in the claims appended hereto, the invention itself, its objects and advantages, the manner of its organization and the mode of its operation will be better understood by referring to the following description taken in connection with the accompanying drawing forming a part thereof in which:

Fig. 1 is a side elevational view partly in section of one embodiment of the invention.

Fig. 2 is a front elevational view of the embodiment shown in Fig. 1.

Fig. 3 is a cross sectional view along the line 3—3 of Fig. 1.

Fig. 4 is a cross sectional view through the gate of Fig. 1 showing a modification adapting the device for diapositives, and Fig. 5 is a view of one type of web suitable for use in the embodiment of Fig. 1.

Referring now to the drawing in which the same numerals identify like parts, a supporting or base plate 5 has an upper body portion 6 of substantially square configuration with an integral extending lower portion forming a pistol shaped handle 7. This part may be a stamping with an overhanging flange 9 on the forward edge of the portion 6 and an overhanging flange 10 for the handle portion 7, the latter forming a very comfortable and firm grip for holding the device. Mounted at right angles to the body portion 6 is a gate element formed in two sections. A section 12 is attached to the body portion 6 by angle ears 13 which may be riveted to the body portion 6 by rivets 14. The angle ears 13 may be similarly attached to the portion 12, or attachment may be by spot welding, the portion 12 having right angle flanges 16 on either edge thereof, as shown in Figs. 3 and 4. These ears may also be formed by bending up a portion of the section 6. The upper and lower ends of the element 12 may be slightly bent to facilitate the passage of a web 20 in to and out of the gate. The web 20 is shown broken at 21 to indicate that it may be a loop of any desired length.

The other element 15 of the gate has a configuration similar to element 12 except that it is designed to nest within the element 12. The element 15 has an extension 22 pivoted at 23 and is held in operating position by a spring 25 wrapped around a pivot pin 27 attached to plate 5 with one end 28 anchored in an aperture of plate 5. The elements 12 and 15, mounted as described, form the gate portion through which the web 20 is passed intermittently, the element 15 having an aperture 30 therein for the observation of opaque pictures mounted upon the web 20. Both elements 12 and 15 also have narrow apertures 32 and 33 therein (see Fig. 3) through which the operating mechanism for moving the web intermittently through the gate may pass. It will be observed that the pictures on the web when at the aperture 30 are illuminated unobstructedly on three sides and partially on the fourth side, thus providing sufficient light for viewing at all times satisfactorily.

Referring now to the mechanism for advancing the web intermittently through the gate, a heart shaped cam 35 is mounted upon a shaft 36 within a bushing 37 in the supporting plate section 6. Surrounding the heart shaped cam 35 is a follower 38 having a slot 39 at one end thereof and pull down pins 40 at the other end thereof. The slot 39 guided by a pin 42 mounted on a portion 6 of the plate 5 aids in controlling the action of follower 38. The follower 38 is held in position on the cam 35 by means of washers 41 and 43 mounted on shaft 36 on either side of the cam. Rotation of the shaft 36 therefore produces a motion of the pull down pins 40 so that they will enter perforations 45 of the web 20 at the top and intermittently advance the web downwardly. The film may be advanced upwardly by a reverse motion. The shaft 36 is actuated by a gear 47 mounted on the end thereof on the opposite side of the plate 5 and is meshed with a larger gear 48. The larger gear 48 is mounted on the end of a shaft 50 within a bushing 51 mounted on the plate 6. Shaft 50 has mounted on its opposite end a crank 52 for manual operation of the heart shaped cam 35 and for advancement of the web 20.

The web 20 is preferably of the 35 mm. size or larger and the pictures thereon may thus be satisfactorily viewed directly at the aperture 30. However, for viewing pictures on the web 20 in enlarged proportions, a viewing tube 54 having a magnifying lens 55 therein of any desired magnification and a comfortable eye piece 56 is adjustably mounted on a split ring 57 extending from the flange 9 of plate 5 and which may be attached thereto in any suitable manner such as by rivets 58 or by welding. The tube 54 may slide within the split ring 57 for adjustment to the eyes of the observer.

The gears 47 and 48 may be exposed but are preferably enclosed by a cover member 60 which may be attached to the plate portion 6 by means of ears 61 bent over after passing through appropriate apertures in the plate portion 6.

With the above described modifications, there is provided a very simple viewing device which permits manual operation with one hand while holding the device with the other and which permits the advancement through the gate of a film or web of comparatively large width. The web 20 may be a web such as a 35 mm. or wider film or other suitable carrier such as cloth "cellophane", or thin metal upon which is mounted a series of printed pictures depicting a series of kinematic phases of an object. These pictures may be mounted on one or both sides of the base carrier and the web reversed or turned inside out for viewing the other series of pictures. The pictures may also be printed upon paper with sufficient tenacity to serve as a web without a carrier. The web is easily inserted within the gate by simply pushing the section 15 thereof forward and slipping the web between the elements 15 and 12. The web 20 may then be pulled until a picture registers with the aperture 30. Although the web 20 is shown with uniform apertures, it is also within the contemplation of this invention that a web 68 be utilized with apertures 69 spaced as shown in Fig. 5 to facilitate registration of the pictures. The base carrier web or paper strip may have uniformly or unevenly spaced apertures along one edge only with pictures on one or both sides, thus providing a larger picture width for a given carrier width. With a single row of apertures the pictures are in reverse order or opposite sides of the strip. With double apertures and the pictures in the same order the web may carry pictures relating to different subjects on each side thereof and the web reversed for viewing each subject, or with both sides carrying the same subject, one end of the web or strip may be twisted 180° and both sides will be presented at the viewer aperture in the proper order thus doubling the length of time or scene for a given length of web. These novel types of picture strips or carriers are disclosed and claimed in my above mentioned copending application. The aperture 30 is, of course, of a size to present the full picture to view in accordance with the picture size.

In Fig. 4 a slight modification of the gate element 12 has been made which consists in providing an aperture 63 therein and the providing of an element 64 having a polished angle portion 65 to reflect light therefrom through the aperture 63 of the element 12 and the aperture 30 of the element 21. The reflector 65 may be attached to the plate section 6 in any suitable manner such as rivets 66. By this modification, diapositives such as ordinary motion picture film may be advanced through the device and viewed by transmitted light.

The invention as above described is simple to manufacture since substantially all the parts thereof may be stampings or moldings and the method of attaching the various parts may be by rivets or welding. The type of handle provided has been found to provide particularly satisfactory operation by making the device easy to hold in a steady position while the design and positioning of the advancing mechanism does not introduce undue jerks. The energy applied at the crank 52 is either utilized in advancing the web 20 or is directed into the handle 7 so that lateral displacement of the device is avoided.

I claim:

1. A device for presenting pictures of kinematic phases of objects to view comprising a substantially flat supporting plate, an extension formed as part of said plate adapted to form a handle for holding said plate, said extension having substantially right-angled flanges along the edges thereof, a web passing gate attached at right angles to said plate and adapted to hold said web in viewing position, means for advancing said web through said gate located on the same side of said plate as said gate, mechanical means for actuating said advancing means, said mechanical means being mounted on the opposite side of said plate from said gate, manual actuating means for said mechanical means extending through said plate and located on the same side of said plate as said gate and said advancing means, and means for viewing said web.

2. A device for viewing pictures of kinematic phases of an object comprising a supporting plate, a downwardly extension of said plate of narrower width than said plate and forming a handle therefor, said extension tilting backwardly from the front edge of said plate, a vertical gate positioned adjacent the front edge of said plate and perpendicular to said plate, said gate having a fixed portion and a resiliently mounted apertured portion, means mounted near the center and on the same side of said plate as said gate for advancing a series of pictures through said gate intermittently, mechanical means on the opposite side of said gate from said advancing means for actuating said advancing means, manual means extending through said plate for operating said mechanical means, and means extending from the front edge of said plate for viewing pictures on said web, said last mentioned means being adjustably supported on said plate.

3. A device for presenting pictures of kinematic phases of objects to view comprising a main supporting plate, one portion of said plate being elongated to form a handle and another portion being substantially symmetrical about a central point, said handle portion extending at an angle from said symmetrical portion and having substantially right-angled flanges therein, a web passing gate attached at right angles to said plate and adapted to maintain said web flat while passing therethrough, said gate being mounted toward the front edge of said symmetrical portion of said plate, means mounted on the opposite side of said plate from said gate and attached to said plate near the center of said symmetrical portion of said plate for advancing said web through said gate, and means mounted on the gate side of said plate and attached to said last-mentioned means for actuating said last-mentioned means to pass said web through said gate.

4. A device for presenting pictures of symmetrical phases of objects to view comprising a substantially flat supporting plate, an extension as an integral part of said plate adapted to form a handle for holding said device, said extension having substantially right-angled flanges along the edges thereof, an apertured web passing gate attached at right angles to said plate and adapted to hold said web in viewing position, means for advancing said web through said gate, said means being located on the same side of said plate as said gate, manual actuating means for operating said advancing means, said manual actuating means being on the same side of said plate as said gate, means for interconnecting said advancing means and said manual actuating means for transmitting energy therebetween, and means attached to said plate adapted to direct light through the aperture in said web passing gate.

WARREN C. TICHENOR.